Dec. 16, 1969   C. H. BOLL ET AL   3,483,832
APPARATUS FOR BURNING INDUSTRIAL WASTES
Filed April 16, 1968   3 Sheets-Sheet 3
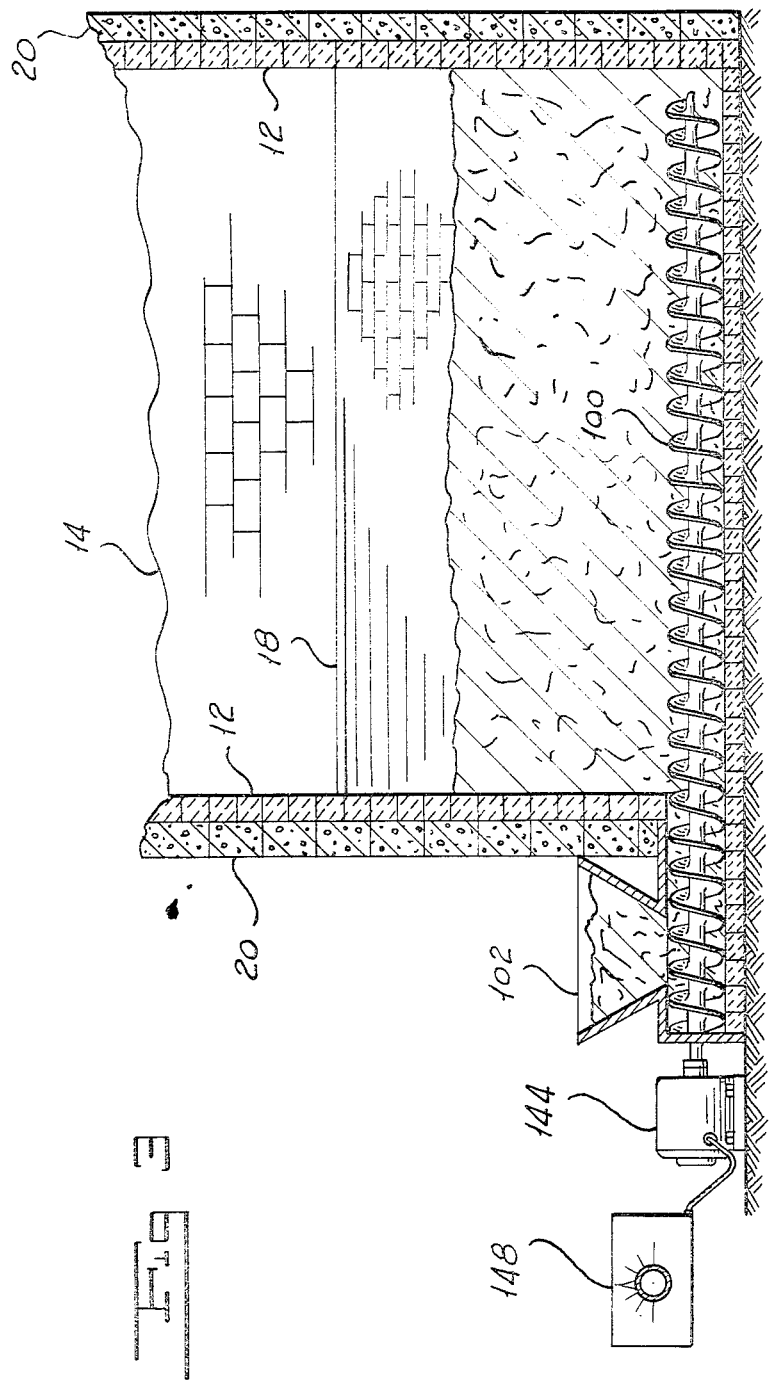
INVENTORS
Carelton H. Boll
Robert P. Lanyon
BY
Steiner + O'Connor
ATTORNEYS United States Patent Office
3,483,832
Patented Dec. 16, 1969

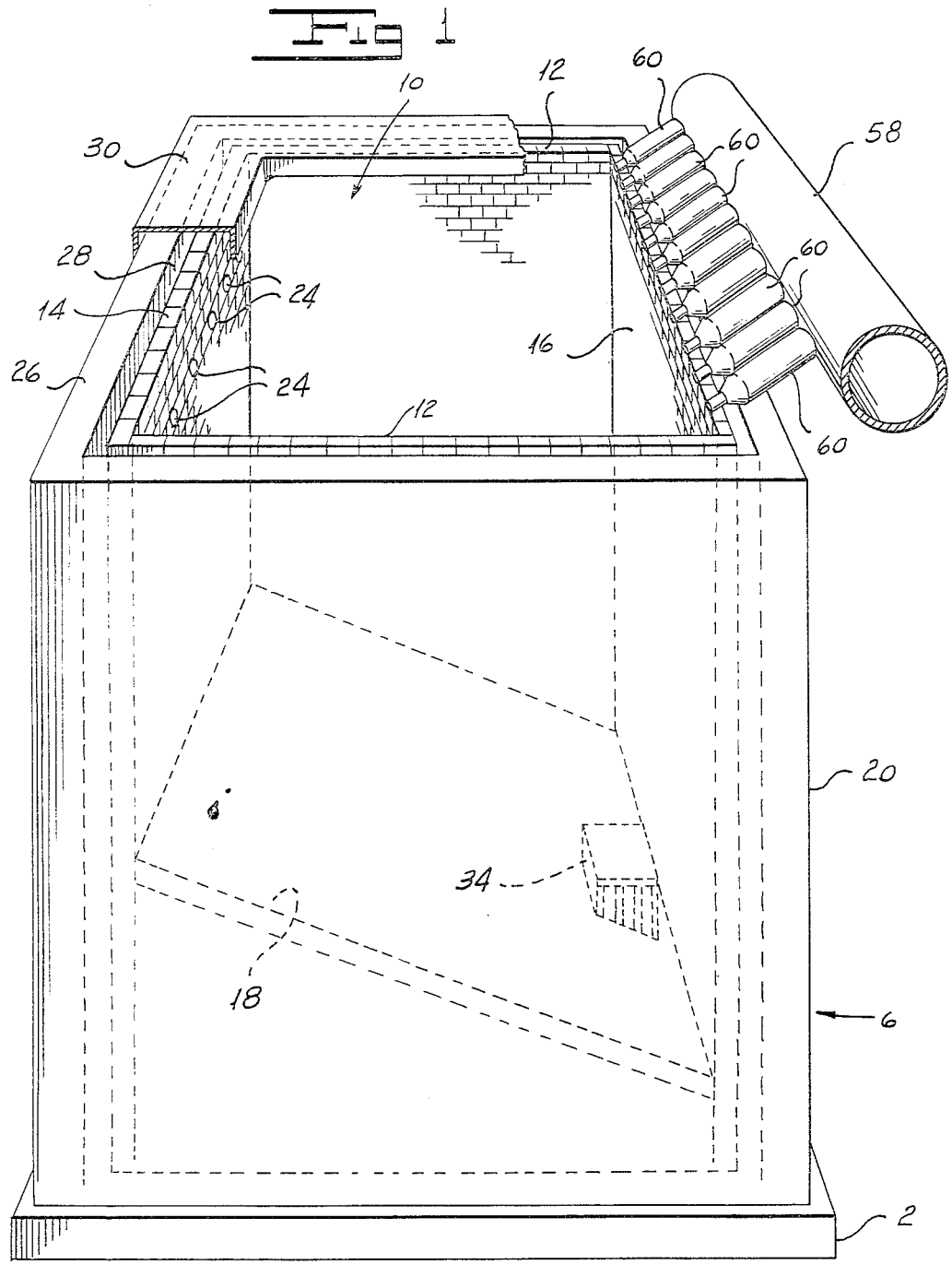

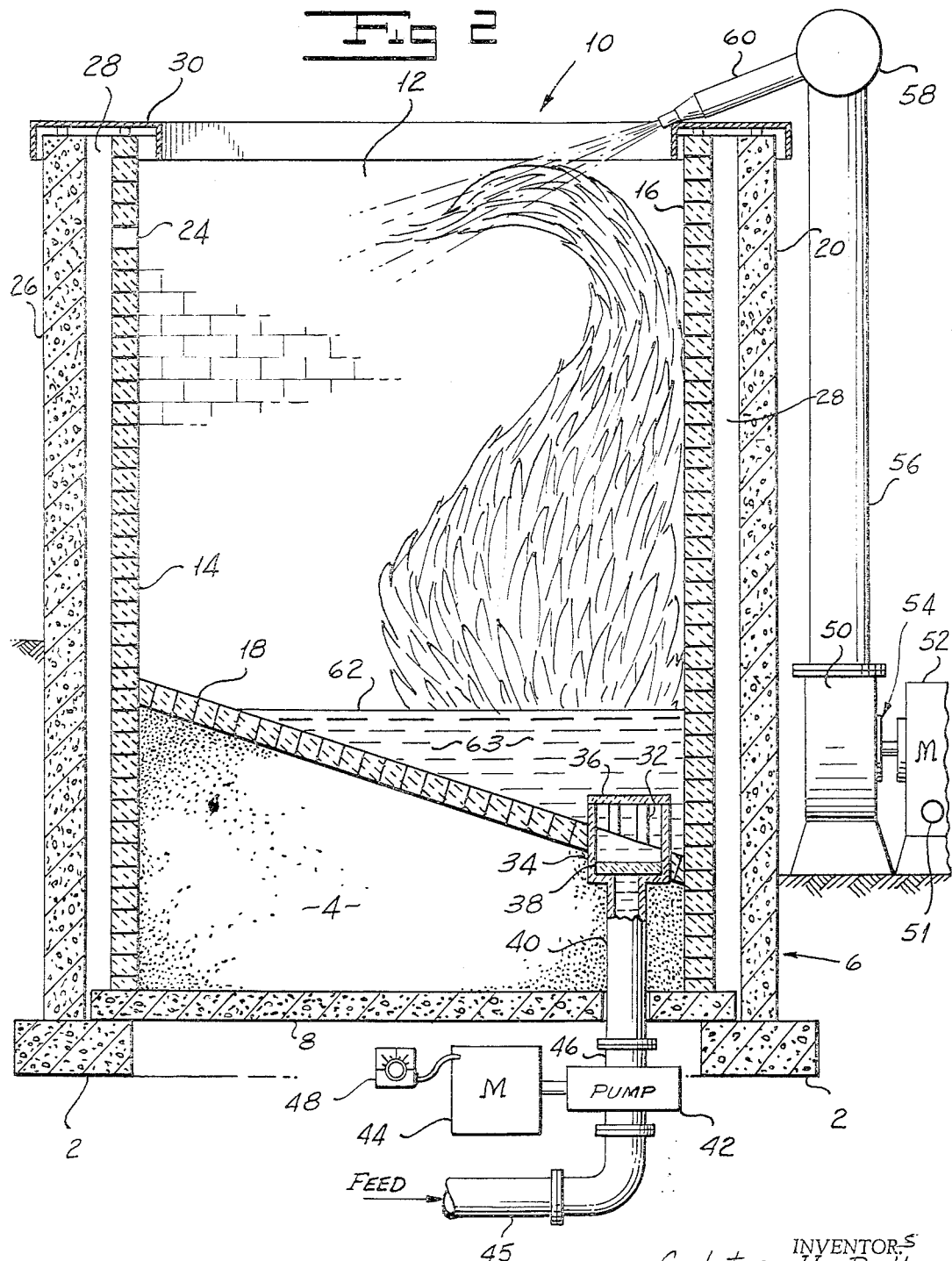

3,483,832
APPARATUS FOR BURNING INDUSTRIAL WASTES
Carleton H. Boll, Rumson, and Robert P. Lanyon, Edison, N.J., assignors to Solvents Recovery Service of New Jersey, Inc., a corporation of New Jersey
Filed Apr. 16, 1968, Ser. No. 721,832
Int. Cl. F23b 1/38; F23k 1/10
U.S. Cl. 110—7                                    4 Claims

ABSTRACT OF THE DISCLOSURE

We provide a combustion chamber having vertical side walls, an open top and an inclined hearth at the bottom. A plurality of nozzles are positioned across the top of one side wall of the combustion chamber to direct high velocity air into the combustion chamber. The surface area of the material being incinerated is a critical factor in obtaining smokeless and odor free combustion. We control the surface area by controlling the rate of feeding of the material to be burned. The surface area control is accomplished by the inclined bottom. The construction is such that the higher the level of the material being incinerated on the hearth, the greater is the exposed surface area. Conversely, the lower the surface level of the material being burned is on the hearth, the narrower is the exposed surface area of the material.

Background of the invention

Pollution of the atmosphere is becoming an increasingly graver problem owing to the necessity of disposing a wide variety of wastes by combustion. Bottom settlings from distillation processes designed to purify various industrial solvents, chemical wastes of various types, natural and synthetic rubber wastes, cellulose wastes and synthetic resin wastes, garbage and the like are difficult to consume without producing soot, smoke and noxious gases.

E. S. Monroe, Jr., of E. I. du Pont de Nemour & Company of Wilmington, Del., reported the design of an open top incinerator using a plurality of air jets along one wall of the incinerator to achieve combustion rates almost double those obtainable with conventional designs. (E. S. Monroe, Jr., "Recent Combustion Developments Prevent Air Pollution," Mid-Atlantic Section, ASCA, Trenton, N.J., Nov. 19, 1964.) The air jets produced a cylindrical rolling flame which had adequate time to complete combustion. Flame temperatures were high, and turbulence or mixing of the air and the fuel in disposing of nitrocellulose wastes were enhanced. This resulted in complete and thorough combustion.

The hearth width dimension of Monroe's open top incinerator, however, is critical and must be sized to the B.t.u. regardless of the fuel to be burned. If the hearth is to wide, that is, the surface area is too great, an excess of flame develops and smoke results. If the hearth is too narrow, that is, the surface area is too small, there is not enough flame with the result that the walls of the incinerator do not get hot enough and the resultant loss in radiant heat is such that when a sufficient quantity of air is fed to create a turbulent rolling flame the fire goes out. It is not possible to control the combustion by controlling the air flow. Too much air blows the fire out and provides too little residence time of combustible gases released within the combustion chamber to complete combustion. Too little air results in lack of turbulence and in smoke.

The result is that an incinerator design for one industrial waste cannot be easily or effectively used for other industrial wastes or for other wastes.

We have invented an incinerator which is capable of disposing of any type of waste with reduced fuel consumption, reduced smoke and soot, reduced noxious gases and other atmospheric pollutants.

Summary of the invention

One object of our invention is to provide an improved method and apparatus which effectively burns any type of waste material with reduced pollution of the atmosphere.

Another object of our invention is to provide a method of incinerating wastes in an efficient, smokeless and sootless manner.

Another object of our invention is to provide an open top incinerator which is easy to maintain and easy to operate and which will accommodate a wide variety of different types of wastes by insuring optimum combustion conditions.

Other and further objects of our invention will appear from the following description.

In general, our invention contemplates the provision of a combustion chamber having an inclined hearth and provided with an air supply over the bed of material to be burned. The inclined hearth may be in the form of an inverted cone. More conveniently however, it is formed with an inclined bottom between two substantially vertical walls. The wastes to be burned are fed to the hearth at a low point therein as for example at a point where the hearth makes an acute angle with a vertical wall. The effective width of the hearth will be the width of the burning surface of the material being incinerated. This width is varied by the rate of feeding of the material to be burned to the combustion chamber. An increase in the rate of feeding provides a wider effective hearth surface. Decreasing the rate of feeding narrows the effective hearth width.

BRIEF DESCRIPTION OF THE DRAWINGS

In the accompanying drawings which form part of the instant specification and which are to be read in conjunction therewith and in which like reference numerals are used to indicate like parts of the various views:

FIGURE 1 is a perspective view of the combustion chamber of an incinerator with parts broken away showing one embodiment of our invention.

FIGURE 2 is a sectional side view of the incinerator as shown in FIGURE 1 with all parts shown for the incineration of liquid wastes.

FIGURE 3 is a sectional elevation showing another embodiment of our invention for the incineration of solid wastes.

Description of the preferred embodiment

Referring now to the drawings and particularly to FIGURES 1 and 2, footings 2 support a base member 8 formed of reinforced concrete and an outside reinforced concrete outer wall indicated generally by the reference numeral 6. Also carried by the base member 8 and spaced from the outside reinforced concrete wall 6 is a combustion chamber indicated generally by the reference numeral 10. This combustion chamber is formed of refractory brick having side walls 12, a rear wall 14 and a front wall 16. The hearth 18, which is formed of refractory brick, is supported by packed sand 4 within the walls of the combustion chamber as can readily be seen by reference to FIGURE 2. In use the refractory brick becomes red hot and acts as a source of radiant heat which assists in vaporizing volatile constituents of the wastes being burned. The walls of the combustion chamber are spaced from the reinforced concrete outer wall 6 to provide an air space 28. A rain cap 30 bridges the air space to prevent rain from filling this space. If desired we may provide openings 24 adjacent the upper portion of the walls of the combustion chamber to permit the circulation of cooling air.

The bottom of the hearth is provided with a rectangular opening into which a valve housing 34 extends. The valve housing terminates in a plurality of openings 32 and a top 36 adapted to retain a ceramic check valve 38 in position to close the opening to inlet pipe 40 when the flow of liquid wastes is stopped.

Liquid waste from any suitable source (not shown) is drawn by a pump 42 driven by a motor 44 through pipe 45 and discharged through pipe 46 into pipe 40, the outlet of which is controlled by the check valve 38. The motor 44 may be of any appropriate design and is provided with a speed control 48. Adjacent the front wall 20 we provide a centrifugal blower 50 driven by a motor 52 governed by a speed controller 51. Air from the atmosphere enters the blower inlet 54 and is discharged through duct 56 into an air manifold 58 with the interior of which a plurality of downwardly inclined nozzles 60 communicate. The nozzles project over the front wall and downwardly into the open combustion chamber 10.

The exposed surface of the liquid waste 63 is indicated by the reference numeral 62.

In operation the pump motor 44 is started by its controller 48 and liquid waste is pumped past the check valve 38 into the bottom of the hearth. The fan motor 52 is started and operated at a low speed through its speed control 51. If the waste is not readily combustible, fuel such as gasoline or kerosene is poured in over the surface of the waste. The surface of the kindling is ignited and combustion started. As soon as the waste begins to burn some smoke will appear. The fan motor is operated to increase the air supply being careful not to provide too much air so as to blow the fire out. If desired an air damper may be employed with a constant speed motor to govern the air supply. When the process starts the air supply is gradually increased either by opening the damper or by increasing the speed of the motor. If light smoke continues to be generated this indicates that there is not sufficient residence time in the hearth of the gases liberated from the combustion to completely burn the gases. The speed of the pump motor 44 is then increased until more flame and smoke appear. This will indicate that surface 62, that is, the effective burning width on the hearth, is too great. The feeding pump motor 44 is then slowed down until the smoke disappears. We have then arrived at the correct feeding rate to give the desired surface width so that substantially smokeless and odor free combustion occurs.

Referring now to FIGURE 3, a combustion chamber for burning solid wastes is shown. The inclined hearth 18 and the rear wall 14 are the same as that shown in FIGURE 2. However, the solid wastes to be incinerated are fed by an auger 100 extending across the combustion chamber adjacent the forward side thereof, that is, the side removed from the rear wall 14. The auger is driven by a motor 144 the speed of which is controlled by a controller 148. The waste material to be incinerated is comminuted in any suitable manner and fed into a hopper 102. It will be understood that the level of the material in the combustion chamber will depend on the rate of feeding of the material to be burned as compared with the rate of combustion of the material. The angle of the hearth 18 is inclined to an extent which is greater than the angle of repose of the comminuted material so that it will always tend to gather toward the front wall of the combustion chamber. The effective burning surface, that is, the exposed surface of the solid material to be incinerated which is exposed to combustion will not be as level as in the case of a liquid waste nor will the combustion remain at the surface of the material. The heat of burning, including the heat which is radiated from the heated walls of the combustion chamber, will cause combustion to take place below the surface of the solid material so that there is a zone of solid material in various states of combustion. The same principles, however, apply in the case of solid wastes as in the incineration of liquid wastes. If the exposed surface on the hearth is too wide there will be too much flame and smoke will occur. If the effective width is too narrow there is not enough material burning to keep the refractory material of the combustion walls hot and the fire will gradually die down and gases released from the burning mass of material being incinerated will be incompletely burned and will act to pollute the atmosphere. It is to be noted that except in the starting of the operation the air is never varied as the amount of air to obtain turbulent flow is constant. The control must be by the rate of feeding to control the effective area of the material being burned. The control is achieved by maintaining the flow of air at a constant rate and varying the feeding of the material through the speed control 148 for the motor 144.

It will be seen that we have accomplished the objects of our invention. We have provided an improved method and apparatus for effectively burning any type of waste material with reduced pollution of the atmosphere and have provided apparatus for effecting substantially complete combustion. Our incinerator is flexible and can be used to burn various types of industrial wastes with reduced atmospheric contaminants.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for incinerating wastes including in combination a combustion chamber having an open top and an inclined bottom, said chamber having a front wall disposed adjacent the lowermost portion of said inclined bottom, air distributing means extending across the front wall adjacent the top of the combustion chamber for directing air downwardly into the combustion chamber, a pump for feeding liquid material to be incinerated into the combustion chamber adjacent the bottom of said front wall and means for controlling the speed of said feeding means.

2. Apparatus as in claim 1 in which said means for controlling the speed of said feeding means includes a motor and means for controlling the speed of said motor.

3. Apparatus as in claim 1 in which said means for directing air downwardly into the combustion chamber includes a plurality of nozzles.

4. Apparatus as in claim 1 including a discharge conduit from said pump into the combustion chamber and a check valve between the bottom of the combustion chamber and said pump.

References Cited

UNITED STATES PATENTS

| | | |
|---|---|---|
| 895,764 | 8/1908 | Jones. |
| 2,276,659 | 3/1942 | Kreisinger _____ 110—7 X |
| 3,051,100 | 8/1962 | Singleton. |
| 3,354,847 | 11/1967 | Clement et al. _____ 110—7 |
| 3,357,375 | 12/1967 | Brophy. |
| 3,404,643 | 10/1968 | Anderson _____ 110—10 |

KENNETH W. SPRAGUE, Primary Examiner

U.S. Cl. X.R.

110—44